Dec. 14, 1948.  G. R. ELLIOTT  2,455,985
HYDRAULIC BRAKE BOOSTER
Filed May 14, 1945
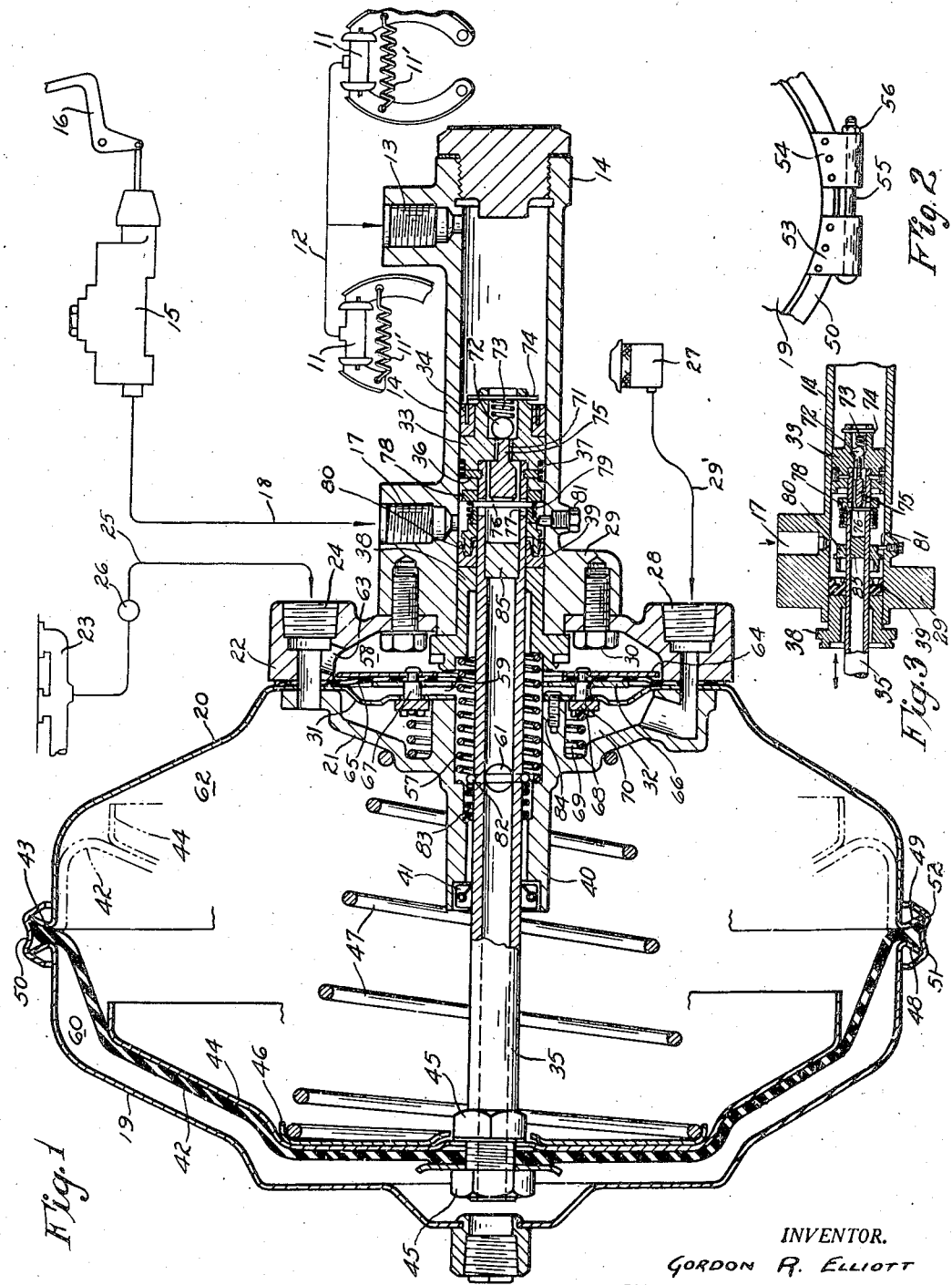
INVENTOR.
GORDON R. ELLIOTT
BY
Robert A. Sloman
ATTORNEY Patented Dec. 14, 1948

2,455,985

UNITED STATES PATENT OFFICE 2,455,985

HYDRAULIC BRAKE BOOSTER

Gordon R. Elliott, Ferndale, Mich., assignor to Irving A. Puchner and Edward U. Demmer, Milwaukee, Wis.

Application May 14, 1945, Serial No. 593,723

8 Claims. (Cl. 60—54.5)

This invention relates to a power booster brake mechanism employed in conjunction with a vehicle wheel braking system, more particularly the booster mechanism is adapted to operate in conjunction with a manually operable master cylinder and a hydraulic brake operating cylinder for effecting vehicle power braking as shown similarly in co-pending application Serial Number 573,997, filed January 22, 1945.

It is the object of this invention to provide in combination a hydraulic brake cylinder, an operating piston therein, and air and vacuum control valve, and a valve control piston therefor, also provisioned within said cylinder.

It is the further object herein to provide in combination with a hydraulic brake cylinder an operating piston therein, a power chamber, an intermediate air and vacuum valve, a valve control piston also in said cylinder, and movable operative means in said power chamber, provisioned through said valve and its control piston, and joined to said brake operating piston.

Other objects will be evidenced from the following detailed specification and drawing in which:

Fig. 1 is a side elevational section of the power brake booster including a diagrammatic indication of the master cylinder, a vehicle intake manifold, the wheel brake cylinders, and the connecting conduits therefor.

Fig. 2 is a fragmentary front elevational view of the power chamber shells clamping and aligning ring.

Figure 3 is an enlarged fragmentary elevational section of the hydraulic cylinder shown in Figure 1 with the various elements positioned after brake application.

It will be understood that the above drawing illustrates merely a preferable embodiment of the invention, and that other embodiments are contemplated within the scope of the claims hereafter set out.

In the drawing, Fig. 1, the vehicle brake wheel cylinders 11 are joined by conduit 12 to outlet port 13 in the end of hydraulic cylinder 14. Master cylinder 15 with manually operable foot pedal actuated means 16 is joined to fluid intake port 17 of cylinder 14 by conduit 18.

The power chamber consisting of hollow circular opposing shell members 19 and 20 is joined to the left end of hydraulic cylinder 14 with the air and vacuum valve consisting of valve body members 21 and 22, interposed therebetween.

The vehicle intake manifold 23 provides a vacuum source to vacuum port 24 in valve 21—21 by interconnecting conduit 25 with check valve 26 interposed. On the other hand, air filter 27 is joined to the valve air intake port 28 by conduit 29'.

Valve body 22 is secured to member 29, forming an integral part of cylinder 14, by a plurality of circularly arranged studs 30, two of which are shown in the drawing. The complementary valve body 21 is likewise secured to valve body 22 by a plurality of similar circularly arranged bolts, not shown in the drawing, with the central end portion of shell 20 being interposed therebetween to provide a valve air seat plate 31 with air inlet openings 32.

Fluid control piston 33 with sealing cup 34 is movable within cylinder 14 being secured to one end of the hollow power rod 35 by the two pins 36 retained by coil spring 37. Hollow valve control piston 38 with sealing cup 39 is slidably provisioned within cylinder 14 in spaced relation to fluid control piston 33.

Power rod 35 slidably supported through valve piston 38 is also slidably journaled through the elongated hollow portion 40 forming a part of valve body 21, with a suitable seal 41 being provisioned within the end of member 40 between member 40 and said rod.

Concave annular flexible diaphragm 42 with outer annular sealing rib 43, reinforced by hollow annular plate 44 is secured centrally to the left end of hollow power rod 35 by threaded nuts 45 on opposite sides thereof. Circular spring retainer plate 46 registers with reinforcing plate 44, with coil spring 47 being interposed between plate 46 and valve body 21, to normally and resiliently retain diaphragm 42 in the inoperative position shown.

The opposing shell members 19 and 20 are respectively annularly flanged at 48 and 49 for encompassing the edges of annular rib 43 which forms a part of diaphragm 42. Annular concave broken clamp ring 50 is positioned over shaped flanges 48 and 49 the edges of said flanges resting in the bent portions 51 and 52 respectively of clamping ring 50.

As shown in Fig. 2, brackets 53 and 54 are riveted on opposite sides of clamping ring, and bolt 55 extends through corresponding openings in said brackets, which are adjustably brought together by nut 56 for tightening clamping ring 50 over shell members 19 and 20. Said ring by its special design compresses rib 43 of diaphragm 42 sufficiently to obtain a seal between shell members 19 and 20. However any additional pressure exerted in tightening bolt 55 is forced against the shaped flanges 48 and 49 to make a positive locking stop as well as a means of accurately aligning the two shells. Thus the correct amount of pressure to exert on the clamp ring to obtain a proper seal, a positive lock, and a proper alignment is predetermined.

Referring again to Fig. 1, coiled spring 57 is provisioned within valve body 21—22 with its left end engaging the valve housing and with its other end registering with valve control piston 38 to normally resist movement thereof to maintain, when inoperative, vacuum communication between vacuum chamber 58 and chamber 59. Vacuum communication is established with chamber 60 in shell 19 by means of openings 61 in hollow rod 35.

Vacuum is constantly maintained in chamber 62 within shell member 20 by means of passage 63 in valve body 21—22 which is joined by vacuum conduit 25. With vacuum communication established in both chambers 60 and 62 it is seen that there is an equilibrium of pressure on opposite sides of diaphragm 42. By the existence of spring 47 it is thus seen that when inoperative, the diaphragm and the power shaft assume the position shown in Fig. 1.

To obtain power braking, valve piston 38 is projected to the left on application of master cylinder 15. Piston 38 engages diaphragm plate 64 carried by flexible diaphragm 65 peripherally retained between valve body members 21 and 22. A secondary diaphragm plate 66 of reduced diameter is secured on the opposite side of diaphragm 65 by rivet 67 which extends through both plates and said diaphragm.

Rivets 67 extend outwardly through air openings 32 in air valve seat 31 and are secured at their ends to air valve disc 68, which is normally seated relative to air valve seat 31 by coiled spring 69.

Piston 38 when moved to the left contacts diaphragm plates 64 and 66 closing off vacuum communication between vacuum chamber 58 and chamber 59. Further movement to the left of piston 38 effects translation to the left of diaphragm 65 and corresponding unseating movement of air valve disc 68 permitting air in chamber 70 to pass through annular opening 32 in valve seat 31, and into chamber 59 which is in communication at all times with power chamber 60.

With air in chamber 60 and vacuum maintained in chamber 62, the pressure differential on opposite sides of diaphragm 42 effects translation thereof forcefully to the right carrying therewith power shaft 35 which is joined to brake operating piston 33 to obtain power braking.

Hydraulic piston 33 has a passage 71 therethrough adapted to be closed by ball valve 72 retained within piston 33 by spring 73 and pin 74. Ball valve operating member 75 adapted to unseat ball 72 and to permit its seating relative to piston passage 71, is adjustably retained within the end of hollow shaft 35 by transverse pin 76 within slot 77 formed therein.

Pin 76 also adjustably retains flanged sleeve member 78 relatively to shaft 35, the ends of pin 76 being held by coiled spring 79 provisioned between the end flanges of said sleeve. Ring 80 is interposed between sleeve 78 and sealing cup 39 and is maintained against the latter for movement therewith by the resilient action of spring 73.

Transverse stud 81 extending into cylinder 14 acts as a stop limiting movement of ring 80 to the right, and movements of sleeve 78 to the left.

Operation

On initial application of the vehicle foot pedal energizing master cylinder 15 and directing fluid under pressure through conduit 18, fluid enters the chamber between pistons 33 and 38 effecting movement to the left of valve piston 38 with some fluid passing through passage 71 in piston 33.

Ring 80 and sleeve 78 follow piston 38 to the left under action of ball spring 73, permitting movement to the left of pin 76 and valve member 75 retained thereby. Ball 72 is thus permitted to close passage 71 under expansive action of spring 73. Movement of sleeve 78 to the left ends when spring 73 becomes inoperative on ball 72 seating over opening 71 and piston 33; and a spaced relation now exists between said sleeve and piston 33.

Movement of piston 38 to the left has operated the air and vacuum control valve 21—22 and power rod 35 is projected to the right through piston 38 in the manner above described. Piston 33 with its passage 71 now closed, operatively acts upon the brake fluid within cylinder 14 directing the same at relatively high pressure to the vehicle brake wheel cylinders 11 through port 13.

Movement of power rod 35 to the right also effects movement of sleeve 78 which is loosely joined thereto by pin 76. However as rod 35 and piston 33 move as a unit sleeve member 78 merely floats along therewith but a spaced relation is still maintained between said sleeve and piston 33.

On brake release fluid pressure in the chamber between pistons 33 and 38 is reduced practically to zero permitting return movement of valve piston 38 to the right under action of spring 57 closing off the air to chamber 60 and again establishing vacuum communication thereto by return of diaphragm 65 to its initial position and air valve disc 68 to its seated position under action of spring 69.

Movement to the right of piston 38 is accompanied by a relative movement therethrough to the left of power shaft 35 under action of spring 47, and the relatively high fluid pressure in the hydraulic chamber of cylinder 14. Return of piston 33 joined to rod 35 is limited by engagement of sleeve 78 with stop pin 81. However it is to be noted that the pre-existing spaced relation between sleeve 78 and piston 33 permits movement of piston 33 relative to said sleeve, and pin 76 now retained by sleeve 78 prevents movement of ball unseating member 75 with the result that ball 72 is promptly unseated permitting a quick release of the fluid under pressure in the hydraulic chamber of cylinder 14.

Thus a prompt and quick brake release is obtained immediately upon release of the vehicle foot pedal operating pivotal member 16 which controls the master cylinder. Valve operating piston 38 returns to the right, piston 33 and rod 35 return to the left, and the ball valve 72 is simultaneously unseated releasing fluid pressure from the vehicle brake cylinders 11.

It will be noted that annular ring 82 secured upon power rod 35 is adapted to engage coil spring 83 which is housed within the extended portion 40 of valve body member 21, thereby providing a yielding seat for said power shaft.

It will be noted however that spring 83 effects a slight translation to the right of rod 35 and its piston 33, so that a spaced relation is again established between sleeve 78 and stop pin 81. Thus it is seen that on the next brake application sleeve 78 is free to move to the left as above described in detail.

It will also be noted that the inner circular portion of air valve seat 31 is secured at a plurality of points around valve body member 21 by screws 84. It will further be noted that hollow power shaft 35 has a plug 85 at one end for closing off the opening in said shaft from the chamber between pistons 33 and 38.

As previously described return movement of piston 33 as well as means 35, 42 under action of spring 47, is limited by engagement of sleeve 78 with stop pin 81. However, it will be seen that large spring 47 is now fully expanded. At the same time smaller coil spring 83 has been fully compressed to the extent that there is a small movement to the right of shaft 35 after its brake release return movement.

In addition to the force of spring 47 upon means 33—35—42 it is clear that the brake release springs 11' shown in Figure 1 are also effective in causing the return of said means. When the sleeve or ring 78 contacts the stop pin 81, valve 72 will open, dissipating the remaining return force on piston 33 by brake return springs 11'. As above described spring 83 was originally compressed under action of both the springs 47 and 11'. With springs 11' no longer effective, spring 83 will expand partially causing means 35—42—33 to move slightly to the right. It is this movement to the right which establishes the initial spaced relation between pin 81 and the sleeve 78.

It is this slight movement to the right of shaft 35 which reestablishes a spaced relation between stop pin 81 and sleeve 78. This initial spaced relation between members 81 and 78 is necessary because it provides a means of permitting seating of ball valve 72 prior to power movement of shaft 35. Consequently shaft 35 is immediately effective on actuating piston 33 as ball valve 72 has been seated over opening 71 prior to movement of power shaft 35. Thus any possible lag in brake application is eliminated.

On brake release means 33, 35, 42 are returning to the left, and means 78 first contacts stop 81. However, as above described there is still a spaced relation between means 78 and piston 33. And it is the further movement of piston 33 towards the stopped means 78 which has the effect of unseating ball valve 72 for obtaining a very prompt brake release.

It will be understood that with the brakes applied movement to the right of piston 33 has very little or no effect on the initial leftward movement of piston 38. This follows because even though the brakes may be applied the flow of pressure fluid from unit 15 does not entirely cease and additional fluid will flow into the chamber between pistons 38 and 33 to take up the increased volume of that chamber. This follows because any decrease in the fluid pressure in said chamber between pistons 38 and 33 is automatically taken up by the reaction pressure or "pedal feel" of the operator in making the master cylinder pedal fully effective.

Referring to the operation of diaphragm means 65 initially, and before brake application a balanced vacuum condition exists on both sides thereof. However, as piston 38 moves to the left vacuum is cut off to the chamber to the left of said diaphragm. Further movement to the left of piston 38 unseats air disc 68 so that now there is air to the left of diaphragm 65 with vacuum to the right thereof in chamber 58.

This pressure differential acts on diaphragm 65 tending to move it to the right against the leftward movement of piston 38. Thus it is seen that the pressure differential on opposite sides of diaphragm 65 tends to resist brake application and the extent of this resistance is proportional to the extent of the pressure differential. Consequently on brake application a counter force is created which tends to resist brake application, and which gives to the operator a certain "pedal feel" as the brakes are applied.

Having described my invention, reference should now be had to the claims which follow for determining the scope thereof.

I claim:

1. The combination, a hydraulic cylinder, valve control and fluid control pistons oppositely disposed therein providing a fluid chamber therebetween, there being a secondary fluid chamber in said cylinder for delivering fluid under pressure, a manually controlled pressure fluid source joining said first chamber, adapted for communication with said secondary chamber through an opening in said fluid control piston, and for operative pressure engagement with said valve control piston for effecting movement thereof, a power chamber, a movable member therein, means on said member slidably extending through said valve control piston and joined at its outer end to said fluid control piston and adapted to forceful translation upon a pressure differential on opposite sides of said movable member, and air and vacuum control valve intermediate said cylinder and power chamber engageable by said valve control piston for effecting said differential, and valve means in said fluid control piston engaged by and responsive to initial movements of said valve control piston for closing the opening therein.

2. The combination, a hydraulic cylinder, a power chamber containing a movable diaphragm therein defining a vacuum chamber and an operating chamber on opposite sides thereof, an air and vacuum control valve housing intermediate and co-axial with said cylinder and power chamber, a movable valve member therein, a diaphragm peripherally secured within said housing and supporting said valve member, the latter being adapted to alternately provide vacuum and air communication through said housing to said operating chamber, a valve operating piston adapted to operatively engage said movable valve member, and a brake fluid control piston both in said cylinder, providing a fluid chamber therebetween, there being a secondary fluid chamber in said cylinder for delivering fluid under pressure, a manually controlled pressure fluid source connected to said cylinder intermediate said pistons adapted for communication through an opening in said fluid control piston and for pressure engagement with said valve operating piston, a plunger rod slidably provisioned through said housing, movable valve member, and valve piston, joined at one end to said movable diaphragm and at its other end to said fluid control piston, and resiliently urged valve means in said fluid control piston engaged by and responsive to movements of said valve control piston for closing the opening therein.

3. The combination, a power chamber having a movable member therein defining an operating chamber and a vacuum chamber, a hydraulic cylinder containing a brake fluid control piston and a valve control piston providing a fluid chamber therebetween, there being a secondary fluid chamber in said cylinder for delivering fluid under pressure, a manually controlled pressure fluid source connected to said cylinder intermediate said pistons adapted for communication through an opening in said fluid control piston and for operative pressure engagement with said valve control piston, a valve housing having air and vacuum inlet ports, and an outlet port communicating with said operating chamber, a hollow reciprocable valve member in said housing, a diaphragm peripherally secured to said housing and centrally carrying said movable member providing therebetween a normally closed air passage between said air port and said outlet port, said valve control piston being normally spaced from said valve member providing a normally open vacuum passage between said vacuum port and said outlet port, whereby progressive movement in one direction of said valve control piston closes said vacuum passage and further movement thereof causes movement of said valve member to open said air passage, and partial movement of said valve piston in the opposite direction permits closing of said air passage, and further movement in the same direction opens said vacuum passage, whereby vacuum and air communication are alternately provided to said operating chamber, a vacuum source communicating with said vacuum chamber and with said vacuum inlet port, a plunger rod secured to said power chamber movable member at one end and to said fluid control piston at its other end, slidably provisioned through said valve housing, said valve member, and through said valve operating piston, and resiliently urged means in said fluid control piston responsive to movement of said valve control piston for closing the opening therethrough.

4. A power unit comprising a hydraulic cylinder containing fluid to be supplied under varying pressures to the wheel brake cylinders of a vehicle, a piston in said cylinder operable on said fluid, a manually operable pressure fluid source connected to said cylinder and communicating with said fluid through an opening in said piston, a power chamber, a movable member therein joined at its outer end to said piston and adapted to translation upon a pressure differential on opposite sides of said movable member, an air and vacuum control valve co-axial with and intermediate said cylinder and power chamber for effecting said differential, a secondary piston in said hydraulic cylinder in spaced relation to said first piston engageable with said valve for controlling the same and operable upon by said manually operable pressure fluid source, valve means in said first piston for closing the opening therein, and valve unseating means intermediate said valve means and said secondary piston, responsive to movements of said secondary piston.

5. The combination, a hydraulic cylinder, valve control and fluid control pistons oppositely disposed therein providing a fluid chamber therebetween, there being a secondary fluid chamber in said cylinder for delivering fluid under pressure, a manually controlled pressure fluid source joining said first chamber, adapted for communication with said secondary chamber through an opening in said fluid control piston, and for operative pressure engagement with said valve control piston for effecting movement thereof, a power chamber, a movable member therein, means on said member slidably extending through said valve control piston and joined at its outer end to said fluid control piston and adapted to forceful translation upon a pressure differential on opposite sides of said movable chamber, and air and vacuum control valve intermediate said cylinder and power chamber engageable by said valve control piston for effecting said differential, valve means in said fluid control piston for closing the opening therein, and valve unseating means loosely carried within the means on said movable member and intermediate said valve means and said secondary piston, responsive to movements of said secondary piston and the means on said movable member.

6. A power unit comprising a hydraulic cylinder containing fluid to be supplied under varying pressures to the wheel brake cylinders of a vehicle, a piston in said cylinder operable on said fluid, a manually operable pressure fluid source connected to said cylinder and communicating with said fluid through an opening in said piston, a power chamber, a movable member therein joined at its outer end to said piston and adapted to translation upon a pressure differential on opposite sides of said movable member, an air and vacuum control valve co-axial with and intermediate said cylinder and power chamber for effecting said differential, a secondary piston in said hydraulic cylinder in spaced relation to said first piston engageable with said valve for controlling the same and operable upon by said manually operable pressure fluid source, and valve means in said first piston engaged by and responsive to movements of said valve control piston for closing the opening therein, said valve means being so constructed as to effect closing of said opening before translation of said movable member.

7. The combination, a hydraulic cylinder, an air and vacuum valve control piston and a brake fluid control piston in said cylinder providing a fluid chamber therebetween, there being a secondary fluid chamber in said cylinder for delivering fluid under pressure, a manually controlled pressure fluid source connected to said cylinder intermediate said pistons adapted for communication through an opening in said fluid control piston and for operative pressure engagement with said valve control piston, a power chamber consisting of a pair of cooperating shell members having adjoining annularly flanged portions, a flexible diaphragm with a peripheral rib annularly retained between said flanged portions, and an expansible U-shaped clamping ring enclosing said flanged portions compressing the same for securing said diaphragm within said chamber, a power shaft secured to said diaphragm slidably extending through said valve control piston and joined at its outer end to said fluid control piston and adapted to forceful translation upon a pressure differential on opposite sides of said diaphragm, an air and vacuum control valve intermediate said cylinder and power chamber engageable by said valve control piston for effecting said differential, and resiliently urged valve means in said fluid control piston responsive to movements of said valve control piston for closing the opening therethrough.

8. A power unit comprising a hydraulic cylinder containing fluid to be supplied under varying pressures to the wheel brake cylinders of a vehicle, a piston in said cylinder operable on said fluid, a manually operable pressure fluid source connected to said cylinder and communicating with said fluid through an opening in said piston, a differential fluid pressure motor having a pressure responsive unit including a shaft joined to said fluid control piston and axially movable therewith on energization of said motor, a control valve mechanism for said motor co-axial with said cylinder and power chamber, movable means in said cylinder in spaced relation to said piston, a secondary piston engageable with said valve mechanism for actuating the same, responsive to said manual pressure source, said movable means being responsive to movements of said secondary piston valve means in said fluid control piston for closing the opening therethrough, said valve means, movable means, and said fluid control piston being constructed to afford communication through said piston when said motor is de-energized, and to close off communication therethrough before said motor is energized on application of said manual pressure source, and resilient means engageable with said motor to effect on de-energization thereof return of said fluid control piston to its inoperative position.

GORDON R. ELLIOTT.

REFERENCES CITED

The following references are of record in the file of this patent:

UNITED STATES PATENTS

| Number | Name | Date |
| --- | --- | --- |
| 2,246,140 | Main | June 17, 1941 |
| 2,260,490 | Stelzer | Oct. 28, 1941 |
| 2,308,460 | Stelzer | Jan. 12, 1943 |
| 2,359,687 | Stelzer | Oct. 3, 1944 |